United States Patent [19]

Becker et al.

[11] 4,115,638

[45] Sep. 19, 1978

[54] PROCESS FOR LETTING DOWN ETHYLENE HIGH PRESSURE POLYMERIZATION SYSTEMS

[75] Inventors: Rolf Becker, Weinheim-Hohensachsen; Klaus Borho, Frankenthal; Oskar Buechner, Dudenhofen; Hans Gropper, Ludwigshafen; Ulrich Hartig, Neckargemuend, all of Fed. Rep. of Germany

[73] Assignee: BASF Aktiengesellschaft, Ludwigshafen, Fed. Rep. of Germany

[21] Appl. No.: 811,462

[22] Filed: Jun. 30, 1977

[30] Foreign Application Priority Data

Jul. 15, 1976 [DE] Fed. Rep. of Germany ....... 2631834

[51] Int. Cl.² ............................................ C08F 10/02
[52] U.S. Cl. .................................. 526/61; 526/352.2; 528/499;502
[58] Field of Search ...................... 526/61, 352, 352.2; 528/499, 502

[56] References Cited

U.S. PATENT DOCUMENTS

| 2,728,753 | 12/1955 | Russum et al. | 528/499 |
| 3,079,372 | 2/1963 | Fulknier et al. | 526/61 |
| 3,781,256 | 12/1973 | Sadee et al. | 526/352 |

*Primary Examiner*—Alan Holler
*Attorney, Agent, or Firm*—Keil, Thompson & Shurtleff

[57] ABSTRACT

The invention relates to a process for rapidly letting-down the pressure in continuous high pressure polymerization systems for the polymerization of ethylene. In this process, the let-down hot reaction mixture is passed into an expansion vessel in such a way that the jet of let-down hot reaction mixture issuing from the let-down line is led into the partially water-filled expansion vessel at an angle of from 0° to 45° to the water surface, so that the jet does not enter below the surface but must touch or strike it. The method described makes it possible to let the mixture down partially and thus to slow down the decomposition in the case of explosive decomposition reactions occurring in the polymerization system.

10 Claims, 1 Drawing Figure

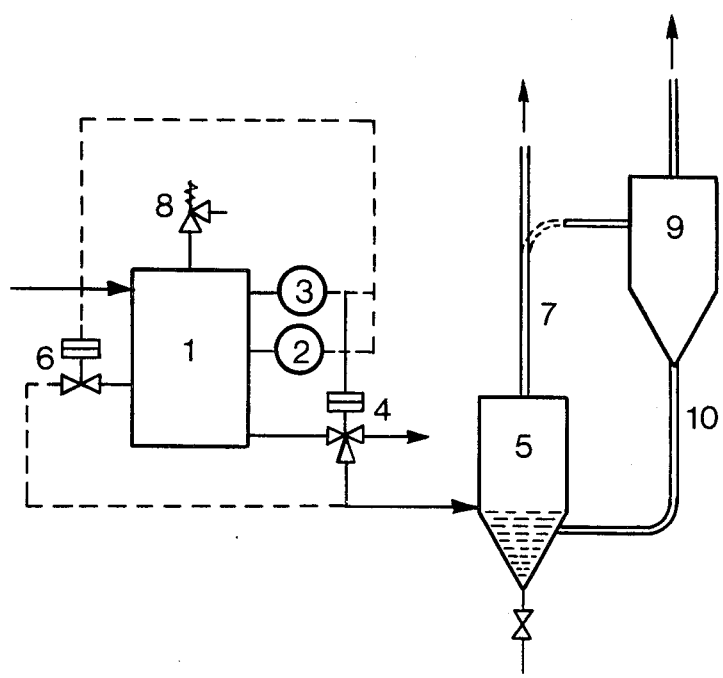

PROCESS FOR LETTING DOWN ETHYLENE HIGH PRESSURE POLYMERIZATION SYSTEMS

The invention relates to a process for rapidly letting down the pressure in continuous high pressure polymerization systems, in which ethylene or a mixture of ethylene and compounds copolymerizable therewith is polymerized at pressures of from 500 to 5,000 bars and at from 150° to 400° C.

In this process, the pressure is lowered to below the particular reaction pressure if a predetermined pressure and/or temperature is exceeded or if other faults occur; the letting down is effected by opening one or more let-down devices attached to the high pressure polymerization system and transferring the hot reaction mixture from the system via one or more let-down lines and through one or two expansion vessels, one or both of which contain water, into the atmosphere.

In such a process, measures to avoid the high pressures and/or high temperatures which, in the event of decompositions, occur in the high pressure polymerization system, and which can lead to damage of, for example, a tubular reactor, are needed. For this purpose, the reaction system is immediately let down to a pressure which is far below the reaction pressure and at the same time the catalyst feed is stopped. This slows down the polymerization reaction, which is highly pressure-dependent. The cold ethylene which enters cools the interior of the high pressure polymerization system. For safety reasons it is not permissible to collect the hot reaction mixture of ethylene, polyethylene and decomposition products, released in the event of decompositions or other emergency shut-downs, in closed vessels. Instead, the reactor must be vented to the atmosphere. When this is done, hot mixtures of polyethylene, ethylene, soot and decomposition products are emitted. In addition to the pollution of the environment which this causes, particularly due to the solids released, gas clouds of hydrocarbon mixtures, e.g. methane, hydrogen and soot may be formed, which, mixed with air, may be capable of explosive ignition. The explosive ignition of such gas clouds constitutes a substantial hazard to the plant and its immediate surroundings. It must therefore be avoided under all circumstances.

To conform to the safety requirements when letting down high pressure polymerization systems, it has already been disclosed to attach to the system a device which essentially consists of a Venturi tube in the exit path of the gas, and a stock reservoir with a fluid which is injected, when the mixture is being let down, in order to cool the gas (cf. French Pat. No. 2,165,018). The fluid may be, for example, water. This device is, for example, unsuitable for separating off solids and the entire contents of the reactor are therefore released into the atmosphere. Using the above device, solid deposits may also be formed in the tube, entailing the hazard of a blockage. Accordingly, the device does not meet the safety requirements.

British Pat. No. 827,682 discloses a process for the high pressure polymerization of ethylene using an apparatus which, immediately downstream from the polymerization chamber, has an additional valve by means of which, in the event of overheating, the decomposition products formed can be removed directly via an expansion vessel without interfering with, or stopping, the continuous working up of the normal polymerization products. In this process, the solid waste products are trapped separately, whilst no separate apparatus is provided for the cooling and purification of the gaseous decomposition products formed.

In another process for the manufacture of ethylene polymers under high pressure and at high temperatures, what happens on exceeding a particular pressure is that the reaction mixture is removed, by means other than the normal outlet line, via a safety device, actuated at the said pressure, through an outlet tube, and is mixed with water (cf. German Laid-Open Application DOS No. 2,158,568). For this purpose, several entirely or partially water-filled containers are provided in a chamber connected to the let-down line; these containers are supposed to fracture at the prevailing temperature and pressure conditions. The water-filled containers are bags made from a thermoplastic. In this process, water is thus admixed to the decomposition gases which are discharged into the atmosphere, so that as a result of the cooling of the hot reaction mixture and of the decomposition products, explosive ignitions in air can substantially be avoided. It is a disadvantage of this process that the introduction of water into the hot off-gases is dependent on the bursting of water-filled plastic containers and that the let-down apparatus can become blocked.

In relation to this prior art, it is an object of the present invention to provide a let-down process for polyethylene reactors which 1. guarantees rapid and reliable letting down, mainly in order to avoid damage to the material of construction and to ensure safety in the reactor unit,
2. excludes the hazard of explosive ignitions outside the reactor zone by rapid and reliable cooling of the hot decomposition mixture and
3. achieves substantial separation of the solids discharged from the reactor, resulting in less pollution of the environment.

According to the invention, these objects are achieved by a method wherein the jet of let-down, hot reaction mixture issuing from the let-down line is led into a partially water-filled expansion vessel at an angle of from 0° to 45° to the water surface so that the jet does not enter below the surface but must touch or strike it. Preferably, the angle between the water surface and the jet of reaction mixture is from 0° to 15°. A method in which the jet of let-down hot reaction mixture enters the expansion vessel tangentially to the wall of the cylindrical vessel is particularly preferred.

In a preferred embodiment, the volume of the expansion vessel should be at least as large as the volume of the high pressure polymerization system to be let down. According to a further preferred embodiment, the amount of water in these expansion vessels should be at least half as great as the volume of the polymerization system, but the maximum amount of water present is 60 percent by volume of the capacity of the vessel. In a further preferred embodiment, the pressure in the high pressure polymerization system is lowered to 50% or less, and more especially to from 8 to 20%, of the original pressure. It is an advantage if the expansion vessel is entirely or partially of cylindrical shape.

In a particularly preferred embodiment of the process, two expansion vessels connected in series are used, so that the gas issuing from the first vessel is fed into the downstream second vessel which contains no water.

For the purposes of the invention, rapid let-down of the pressure means letting down the pressure in the high pressure polymerization system, referred to as the reactor, to 50% or less of the original pressure within about 30, preferably from 5 to 20, seconds after actuating a let-down device. Rapid let-down to low pressures is important to avoid damage to the reactor.

The continuous high pressure polymerization systems in which ethylene or a mixture of ethylene and compounds copolymerizable therewith are polymerized at pressures of from 500 to 5,000 bars and at from 150° to 400° C. are disclosed in the literature. Data on processes using tubular reactors or autoclave reactors are to be found, for example, in Ullmanns Enzyklopädie der technischen Chemie, 3rd edition, volume 14, pages 137 to 148.

The lowering of the pressure to 50% or less of the original reaction pressure is effected whenever predetermined pressure and/or temperature limits are exceeded or other faults arise. For example, the predetermined pressure and/or temperature limits may be exceeded if, because of incorrect catalyst injection or inadequate cooling of the reactor, the polymerization reaction changes into a decomposition reaction, in which the reactor contents are partially converted to soot and gaseous decomposition products, e.g. methane and hydrogen. Since, in order to achieve a high conversion of ethylene, the reaction conditions in the reactor are close to the critical point at which decomposition of ethylene occurs, it may happen that as a result of reduced heat removal, consequent upon polyethylene deposits forming on the reactor wall, or inadequate mixing of the hot mixture contained in the reactor, the reaction conditions locally reach this critical point, causing decomposition to occur. The reactions which thus occur are highly exothermic so that the temperature and/or pressure in the reactor rise rapidly. In this event, the predetermined pressure and/or temperature limits are exceeded. Other faults may occur if the plant is endangered by a current failure or if, for example, a compressor fails so that insufficient ethylene is fed into the apparatus.

The opening of one or more let-down devices fitted to the reactor may be effected by appropriate conventional relief valves. Instead of relief valves which are opened if pressure and/or temperature limits are exceeded, it is in principle also possible to use bursting discs, or safety valves which above a certain pressure limit automatically respond and partially empty the reactor. It is also possible to employ both controlled and automatic let-down devices, but the use of the former is advantageous.

The let-down hot reaction mixture is removed from the reactor via one or more let-down lines which all terminate in an expansion vessel. The let-down lines consist of tubes which are connected both to the reactor and to the expansion vessel so that any gas mixture which may issue from the reactor enters the expansion vessel. In the process according to the invention, this vessel is suitably designed as a separate vessel which withstands a pressure of at least 10 bars. It is generally open at its upper end so that the gas which escapes is either passed directly into the atmosphere or through a second separator vessel of similar construction before entering the atmosphere. According to conventional processes, water is injected into the stream of gas which escapes (French Pat. No. 2,165,018) or water is introduced as a result of the bursting of water-filled plastic containers (German Laid-Open Application DOS No. 2,158,568). According to these processes, the water present in the expansion vessel is evaporated or projected from the vessel into the atmosphere.

According to the process of the invention, the jet of let-down hot reaction mixture, which may also contain the decomposition products, issuing from the let-down line is led into a partially water-filled expansion vessel at an angle of from 0° to 45° of arc to the water surface, so that the jet does not enter below the surface but must touch or strike it. If only one let-down device is used, the said device only leads one jet of hot reaction mixture into the expansion vessel. However, it is also possible to use several let-down devices and lead several gas jets into a single expansion vessel. The critical factor is that the vessel is partially water-filled and that the jet of reaction mixture is led in over or on the water surface, i.e. not under the water surface. The angle at which the jet is led towards the water surface in the partially water-filled expansion vessel is also critical. It must be from 0° to 45° and preferably from 0° to 15°. In a preferred embodiment of the process, the jet may be introduced tangentially or approximately tangentially into the partially water-filled vessel, the angle to the surface at which the jet is led in being from 0° to 45°, preferably from 0° to 15°, and more especially 0°. Approximately tangentially means, for the purposes of the invention, at an angle of from 1° to 5° to the tangential direction. Tangential means touching the inner surface of the cylindrical expansion vessel. In the process of the invention, the jet should touch the water surface, which is the case, for example, if it is led in at an angle of 0°, or should strike the water surface, i.e. impinge on the surface as it comes from above. In general, the point at which the jet is led in is at most 100 cm from the water surface.

The volume of the expansion vessel should be at least as great as the volume of the corresponding reactor, and preferably from 2 to 20 times greater. The volume of the amount of water present in the expansion vessel should, in the preferred embodiment, be from 1 to 5 times the volume of the reactor, taking into account that the vessel in each case contains at most 60 percent by volume of water, preferably from 10 to 50%.

In the preferred embodiment, the let-down method described above lowers the pressure in the reactor to 50% or less, preferably to from 8 to 20%, of the original reaction pressure. In a few cases it is necessary to let down the pressure to 0 bars, i.e. release into the atmosphere.

A preferred feature of the present invention is that the expansion vessel is entirely or partially cylindrical in shape. This is particularly important if the jet, i.e. the compact hot stream of gas, consisting of the moving reaction mixture, is introduced tangentially or approximately tangentially into the vessel. A partially cylindrical shape means, for the purposes of the invention, a shape in which at least a major part, preferably more than 50%, of the vessel is of cylindrical shape. A combination of a cylindrical part and a conical part also conforms to the requirement of a partially cylindrical shape. The vessel is designed as a pressure vessel and withstands a pressure of at least 10 bars.

In the case of the preferred use of two expansion vessels, arranged in series and connected to one another, the gas issuing from the first vessel is led into the second (downstream) vessel before entering the atmosphere. This second vessel may be a cyclone (not containing any water), into which the pre-purified gas is introduced tangentially.

The advantages achieved by the invention are, in particular, that the solids contained in the jet of hot reaction mixture issuing from the let-down line, e.g. polyethylene and/or soot, are removed to the extent of about 90% by weight in the first expansion vessel and do not enter the atmosphere. The remainder of the solids may or may not be removed in a second vessel. At the same time, the process of the invention cools, by means of the water, the gas blown off into the atmosphere, thereby eliminating the explosion hazard. The solids are separated off in the expansion vessels in a finely divided form and not as lumps, so that blockage of the let-down apparatus cannot occur. A further advantage of the process of the invention is that the reaction mixture is mixed with a volume of water which is present to start with, and it is not necessary to admix water to the off-gas by means of jets or bursting water containers. The process of the invention is, therefore, simple and trouble-free and, unless the gas velocity is excessively high, no water is blown into the atmosphere. As a rule, at least the greater part of the water remains in the expansion vessel. At the end of the let-down sequence, the mixture in the vessel separates into an aqueous phase and finely divided solid.

DESCRIPTION OF THE PROCESS OF THE INVENTION

One embodiment of the process will be described with the aid of the accompanying FIGURE, which is discussed below.

The polymerization takes place at the conventional temperatures of about 300° C. in the reactor 1 into which ethylene and the additives required for the polymerization, e.g. catalysts, regulators and the like, are fed under high pressure. The reactor is equipped with at least one temperature indicating controller (TIC) 2, and with at least one pressure indicating controller (PIC) 3 — both designed to switch off if a certain limiting value is reached. Usually, however, several of these measuring and controlling instruments are used. If the pressure or temperature measured on one of the instruments exceeds the present limit, an electrical pulse opens the relief valve and the discharge of the reactor via a pipeline into the expansion vessel 5 commences. As shown by the broken lines leading to the relief valve 6, the discharge process can be speeded up by the use of an additional valve, which is also triggered by the TIC and PIC. The number of relief valves required depends on the size of the reactor and the spatial details.

When the relief valves are called into play, the hot reaction mixture, containing polyethylene and ethylene, with or without decomposition products, flows at high speed through one or more pipelines into the expansion vessel 5. High speed means, in the present context, a value generally not less than 25 m/sec; however, it is also possible to use speeds of 100 m/sec or more.

The volume of the expansion vessel 5 is at least equal to the volume of the reactor to be let down, and is filled to at most 60% of its volume with water, the volume of water being at least equal to half the volume of the reactor to be let down. The cooled reaction gases leave the separator through a discharge pipe 7 (i.e. into the atmosphere), the output point in the separator being above the water surface.

The reactor is additionally equipped with at least one mechanical safety valve 8 which opens automatically when a fixed pressure limit is exceeded. In the process of the invention, it is advisable to set the triggering limits of the measuring instruments (TIC and PIC) to such tight values that the blow-off pressure of the mechanical safety valve is not reached. Accordingly, the latter serves only as an ultimate safety device if the emergency relief of the reactor through the relief valves 4 (and 6) once these have been triggered, should fail to function because of a fault.

The method described makes it possible partially to let down the reactor and thus to slow down the decomposition without releasing the entire contents of the reactor. The advantages of this, due to less material being emitted, are self-evident.

The pressure reduction to 50% or less of the original reaction pressure may be controlled manually or automatically by shutting the relief valve 4 (or 4 and 6) when a predetermined pressure level is reached.

The ethylene/hydrocarbon mixture which leaves the vessel and has substantially been freed from polyethylene, soot and other solid particles, enters the atmosphere through an outlet pipe. In general, the separating action of a single water filled vessel, as described above, suffices. Where the off-gases have to meet extreme standards of purity, a second expansion vessel 9 not containing water may be provided for removing fines; the pre-purified gas enters this vessel tangentially. As a rule, for space reasons, this vessel will be mounted at a higher point than the water-filled expansion vessel 5. The lower end of the expansion vessel 9 is connected to a return line 10, so that any thrown-up particles and water run back into the expansion vessel 5. The finally purified gas leaves the expansion vessel 9 into the atmosphere through a line which is preferably attached to the upper end of the separator.

The installation of several expansion vessels of the type of expansion vessel 5, each of which is filled, from one relief valve, through its own let-down line, is feasible but unnecessary and offers no advantages.

EXAMPLE 1

Polyethylene is manufactured continuously under a pressure of 2,900 bars in a tubular reactor (70 liters volume). The reactor is provided with a let-down valve (similar to the valve 4 in the drawing), which opens when predetermined limits of pressure or temperature are exceeded. The reactor contents are then let down into the expansion vessel 5, which has a volume of 470 liters. This vessel contains 200 liters of water before the let-down process starts. The emergency relief of the reactor is triggered by reducing the switch-off limits (for example, if the reaction temperature is 310° C. and the switch-off temperature 320° C., the latter is reduced manually to $\leq 310°$ C.). The decomposition is triggered by abruptly increasing the amount of catalyst (to about twice the normal "steady state" quantity). For measurement purposes, a cyclone separator (separator 9 in the drawing) is also attached.

The following are measured: the amount of solids collected in the expansion vessel 5 (= M1); the amount of solids collected in the expansion vessel 9 (= M2); the solids content of the reaction gases released into the atmosphere (from the expansion vessel 9), which is so low that it can be neglected in calculating the total solids emission (0.1% of the total solids emitted); the temperature of the emitted gas; the pressure change in the reactor during letting-down.

In Experiment 1.1, the polymerization is carried out at 310° C. (2,900 bars). The TIC switch-off point is set to 325° C. and the PIC switch-off point to 3,000 bars. A decomposition is triggered within a few minutes by abruptly increasing the amount of catalyst. A total of 7.01 kg of solids are emitted in 14 seconds via the relief valve 6 (sum of the collected amounts $M_1 + M_2$), 6.8 kg of solids are collected. This corresponds to a separating efficiency of 97%. The solids are obtained in a finely divided form. The temperature of the gaseous constituents released into the atmosphere is below 100° C.

In Experiment 1.2, a decomposition is again triggered, under identical conditions. 8.05 kg of solids are discharged from the reactor in 13 seconds, through relief valve 6, and the pressure in the reactor drops to 400 bars. 7.98 kg of solids are collected in the expansion vessel 5, corresponding to a separation efficiency of 98.7%. The solids are obtained in a finely divided form. The temperature of the gaseous constituents released into the atmosphere is below 100° C.

In Experiment 1.3, polymerization is carried out at 2,000 bars and 315° C. The TIC switch-off point is set to 330° C. and the PIC switch-off point to 2,150 bars. An emergency switch-off is triggered (without causing decomposition) by manually changing the TIC switch-off point from 330° to 310° C. 3.32 kg of solids are discharged through the relief valve in 12 seconds, and 3.27 kg thereof are collected in the expansion vessel 5. The separation efficiency is 98.6%, the pressure in the reactor drops to 800 bars, and the solids are obtained in a finely divided form. The temperature of the gases released into the atmosphere is below 100° C.

In Experiment 1.4, the polymerization is carried out as described in Example 1.1, at 2,900 bars. An emergency switch-off (without causing decomposition) is triggered by altering the pressure switch-off setting of PIC from 3,000 to 2,800 bars. 5.3 kg of solids are discharged in 7 seconds through relief valve 6. At the same time the pressure drops to 1,300 bars. 5.25 kg are collected in the expansion vessel 5, corresponding to a separation efficiency of 99.2%. The polyethylene is obtained in a finely divided form. The temperature of the released gases is below 100° C.

EXAMPLE 2

Polyethylene is manufactured under a pressure of 2,700 bars in a tubular reactor having a volume of 1,600 liters. The reactor is equipped with two relief valves (as shown in the FIGURE), through which the reactor is let down via separate lines into the expansion vessel 5 (having a volume of 4,200 liters, and filled with water to the extent of 30%). The reaction temperature is 320° C. The TIC switch-off point is set to 335° C. and the PIC switch-off point to 2,850 bars.

Experiment 2.1: a decomposition, accompanied by an abrupt temperature/pressure rise is triggered by increasing the amount of catalyst. A total of 201 kg of solids is discharged in 20 seconds through the two relief valves; 192 kg of these solids are collected in the expansion vessel 5. The separation efficiency is 95%. During letting down, the pressure in the reactor drops to 250 bars. The polymer is obtained in a finely divided form. The temperature of the gaseous constituents released is below 100° C.

Experiment 2.2: this is carried out under identical conditions to those of the preceding experiment. An emergency switch-off (without decomposition occurring) is triggered by altering the TIC switch-off point to 315° C. A total of 142 kg of solids are discharged in 15 seconds through the two relief valves, and 138.5 kg of these solids are collected in the expansion vessel 5. The separation efficiency is 98.5%. During letting down, the pressure in the reactor drops to 1,200 bars. The polymer is obtained in a finely divided form. The temperature of the gaseous constituents released is below 100° C.

We claim:

1. A process for rapidly lowering the pressure in a continuously operated high-pressure polymerization system in which ethylene or a mixture of ethylene and one or more compounds copolymerizable with ethylene is polymerized at from 500 to 5,000 bars and from 150° to 400° C., to a pressure below the prevailing reaction pressure, when predetermined pressure and/or temperature limits are exceeded or another fault occurs, by opening one or more relief devices fitted to the high pressure polymerization system and transferring the let-down hot reaction mixture from the polymerization system via one or more let-down lines through one or more expansion vessels into the atmosphere, wherein the jet of let-down hot reaction mixture issuing from the let-down line is led into a partially water-filled expansion vessel at an angle of from 0° to 45° to the water surface, so that the jet does not enter below the surface but touches or strikes it, the volume of the expansion vessel being at least as great as the volume of the high pressure polymerization system which is to be let down.

2. A process as claimed in claim 1, in which the angle is from 0° to 15°.

3. A process as claimed in claim 1, in which the jet of let-down hot reaction mixture is introduced tangentially into the expansion vessel.

4. A process as claimed in claim 1, wherein the expansion vessel contains an amount of water which is at least equal to half the volume of the polymerization system, but this volume of water is at most 60 percent of the volume of the expansion vessel.

5. A process as claimed in claim 1, wherein the pressure in the high pressure polymerization system is let down to 50% of less of the original pressure.

6. A process as claimed in claim 1, wherein the pressure in the high pressure polymerization system is let down to from 8 to 20% of the original pressure.

7. A process as claimed in claim 1, wherein the expansion vessel is entirely or partially of cylindrical shape.

8. A process as claimed in claim 1, wherein two expansion vessels arranged in series are used, the gas issuing from the first expansion vessel being led into the second, downstream, vessel, which does not contain any water.

9. A process as claimed in claim 1 wherein the volume of the expansion vessel is from 2 to 20 times the volume of the high pressure polymerization system which is to be let down.

10. A process as set forth in claim 1 wherein the volume of water present in the expansion vessel is from 1 to 5 times the volume of the polymerization system, and this volume of water is from 10 to 50% of the volume of the expansion vessel.

* * * * *